Feb. 16, 1932.   J. W. ALLEN   1,845,212
CROW TRAP
Filed April 28, 1930
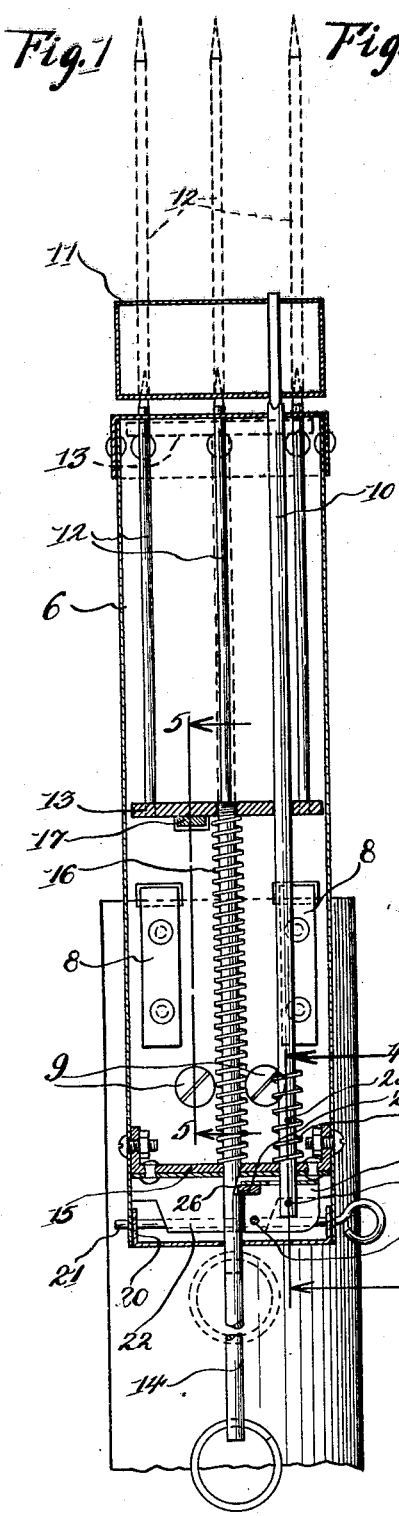
Inventor
James W. Allen
By Stryker & Stryker
Attorneys Patented Feb. 16, 1932

1,845,212

UNITED STATES PATENT OFFICE

JAMES W. ALLEN, OF ST. PAUL, MINNESOTA

CROW TRAP

Application filed April 28, 1930. Serial No. 447,898.

It is the object of this invention to provide efficient means for destroying harmful birds such as crows.

The invention will be best understood by reference to the accompanying drawings in which Figure 1 is a central vertical section through my device, taken on the line 1—1 of Fig. 2; Fig. 2 is a side elevation of the same; Fig. 3 is a plan view of the same; Fig. 4 is a fragmentary section taken on the line 4—4 of Fig. 1 and Fig. 5 is a fragmentary section taken on the line 5—5 of Fig. 1.

My device has a long and relatively thin, rectangular casing 6 adapted to be secured in upright position on a suitable support, such as a post 7. A pair of angle clips 8 project from one side of the casing and are perforated to receive screws or other attaching means to engage the top of the post 7. Screws 9 may also be employed in firmly securing the casing to the post, the latter screws extending through perforations in the casing 6 from the interior thereof. Supported on a trigger rod 10 on the upper end of the casing 6 is a perch 11 for the birds. A series of impaling members 12 are extensible from suitable perforations in the top of the casing. These impaling members consist of parallel rods with sharpened upper ends located, when the trap is set, beneath the top of the perch 11. In the embodiment illustrated there are six of the impaling members 12, three spaced along each longitudinal side of the perch 11 and arranged to be simultaneously thrust upward, as indicated in dotted lines in Fig. 1. At their lower ends the impaling members 12 are rigidly connected by a plate 13. The assembly of impaling members and plate 13 may be retracted by a vertical rod 14 which is secured to the plate 13 at one end and projects from the bottom of the casing. This rod 14 is guided in the bottom of the casing 6 in a horizontal member 15 spaced from the bottom of said casing. A stout coiled spring 16 is confined on the rod 14 between the plate 13 and member 15, said spring being held under compression when the trap is set, as shown in full lines in Fig. 1.

A stop bar 17 projects beneath the plate 13 to limit downward movement of the impaling members and this bar 17 is rigidly secured to a removable side 18 of the casing 6. A series of fingers 19 project from the upper end of the side 18 for insertion in slots in the top of the casing. The bottom of the casing is integral with the lower edge of the side 18 and provided with upturned flanges 20 which are perforated to receive removable rods 21 adapted to hold the removable side 18 in place when closed.

As best shown in Figs. 1 and 4, a channel member 22 is secured to the bottom of the rigid guide bar 15 and has downwardly projecting flanges between which a trigger or detent 23 is pivotally mounted on a pin 24. Adjacent to the rod 14 the detent is provided with a tooth 25 adapted to engage in a notch 26 in said rod. The trigger rod 10 projects downward from a perforation in the bar 15 and is connected to the trigger 23 by a pin 27. To normally support the perch 11, trigger 23 and extend the tooth 25 into the notch 26, a spring 28 is confined on the rod 10 between the bar 15 and a pin 29. Said pin 29 projects at the sides of the rod 10, as best shown in Fig. 4, and the tension of the spring 28 may be adjusted by removing the pin 29 and confining more or less of the spring between said pin and the bar 15.

It will be understood that the perch 11 is fixed on the upper end of the rod 10 and is normally supported in spaced relation to the upper end of the casing 6 by the spring 28. The tension of the spring is adjusted so that the weight of a bird, of the size it is desired to destroy, will be sufficient to compress the spring between the pin 29 and bar 15 and permit movement of the rod 10 downward with resulting withdrawal of the tooth 25 from the notch 26.

In use the post 7 is located in a field which it is desired to protect from the birds and the trap is mounted on said post as hereinbefore described. To set the trap it is only necessary to draw the projecting rod 14 downward until the plate 13 strikes the stop bar 17. At this point the spring 28 raises the detent 23 and causes the tooth 25 to enter the notch 26. Now when the rod 14 is released the spring 16 is held under compression by the trigger tooth 25.

It is well known that harmful birds, such as crows, will alight on any convenient high point or perch and where my trap is located in a grain field or the like where there are no other convenient roosting places, it has been found that they almost invariably alight on the perch 11. When a bird of weight equal to or greater than the minimum for which the trap has been adjusted alights on the perch 11 the rod 10 is thrust downward against the action of the spring 28 so as to withdraw the tooth 25 from the notch 26. This releases the impaling members and the spring 16 thrusts them upward with sufficient force to penetrate and kill the bird. To reset the trap the rod 14 is merely grasped and pulled down while the preceding catch is removed. By proper adjustment of the spring 28, the trap is rendered inoperative to destroy the small birds which in most cases are not harmful to the crops. The device has been found to be highly efficient in destroying the larger, harmful birds.

Having described my invention what I claim as new and desire to protect by Letters Patent is:

1. In a bird trap, a movable perch, extensible and retractile impaling members mounted in parallel relation to each other and normally retracted beneath said perch and extensible upward at opposite sides of the same, an actuating spring for said impaling members, a manually operable member for retracting said impaling members, a detent for retaining said members in retracted position against the action of said spring, a trigger rod supporting said perch and operatively connected to said detent and a spring coiled about said rod and arranged to normally hold said detent in operative relation to said impaling members and to extend said rod upward.

2. A bird trap comprising, a long, relatively narrow casing rigidly mounted in upright position, a depressible perch adjacent to the upper end of said casing, a trigger rod extending longitudinally within said casing and projecting from the top thereof to support said perch, a series of impaling members extensible upward from said casing adjacent to said perch, a spring arranged in said casing to project said impaling members upward, a detent, a trigger spring coiled on said trigger rod for supporting it and for normally holding said detent in operative relation to said impaling members, means for adjusting the tension of said trigger spring and a connection between said trigger rod and detent for withdrawing said detent from operative position when said perch is depressed against the action of said trigger spring.

In testimony whereof, I have hereunto signed my name to this specification.

JAMES W. ALLEN.